(12) United States Patent
Liang

(10) Patent No.: US 12,268,986 B2
(45) Date of Patent: Apr. 8, 2025

(54) DEVICE FOR CONVERSION OF CARBON DIOXIDE TO OXYGEN

(71) Applicant: Rue-Lan Liang, Taoyuan (TW)

(72) Inventor: Rue-Lan Liang, Taoyuan (TW)

( * ) Notice: Subject to any disclaimer, the term of this patent is extended or adjusted under 35 U.S.C. 154(b) by 794 days.

(21) Appl. No.: 17/511,196

(22) Filed: Oct. 26, 2021

(65) Prior Publication Data
US 2023/0125820 A1    Apr. 27, 2023

(51) Int. Cl.
*B01D 53/24* (2006.01)
*B04B 5/08* (2006.01)
*B04B 9/02* (2006.01)
*C01B 13/02* (2006.01)

(52) U.S. Cl.
CPC ............... *B01D 53/24* (2013.01); *B04B 5/08* (2013.01); *B04B 9/02* (2013.01); *C01B 13/0203* (2013.01)

(58) Field of Classification Search
CPC .. B01D 53/24; B04B 5/08; B04B 9/02; C01B 13/0203
See application file for complete search history.

*Primary Examiner* — Walter D. Griffin
*Assistant Examiner* — Shuyi S. Liu
(74) *Attorney, Agent, or Firm* — Chun-Ming Shih; HDLS IPR SERVICES

(57) ABSTRACT

A device for conversion of carbon dioxide to oxygen, includes, in order, an axial compressor, a centrifuge compressor, a drum, an air pump, and a housing which provides an accommodating space to house the above assemblies together. The axial compressor and centrifuge compressor inhale the carbon dioxide rich air into the accommodating space, then the carbon dioxide rich air pass through the surface of the reactor drum which cause the carbon dioxide bouncing between the reactor drum and the wall of the accommodating space, the collisions of the carbon dioxide molecules will bend and break the molecule bond between carbon and oxygen to produce oxygen. The device, as mentioned earlier, provides a solution to the greenhouse effect, which eliminates the carbon dioxide and generates oxygen by physical method, and advances a design to enhance the conversion process, which has the potential of being enlargement.

13 Claims, 5 Drawing Sheets

DEVICE FOR CONVERSION OF CARBON DIOXIDE TO OXYGEN

BACKGROUND OF THE INVENTION

Field of the Invention

The present invention relates to a carbon dioxide converter and, more particularly, a converter that generates oxygen from carbon dioxide by the physical collision of the molecule instead of the chemical reactions.

Description of the Prior Art

Nowadays, the threat of climate change is one of the most critical global problems. The main bane of climate change is the greenhouse gas, more particularly carbon dioxide.

Regarding the climate change due to carbon dioxide, the global governments have legislated several environmental policies to reduce the emission of carbon dioxide; however, few of them provide solutions to eliminate carbon dioxide In 2010, Chueh, William C., et al. "High-flux solar-driven thermochemical dissociation of CO2 and H2O using non-stoichiometric ceria." Science 330.6012 (2010): 1797-1801, discovered that carbon dioxide may be converted into oxygen by the collisions of the carbon dioxide molecules.

However, the converter provided by Chueh, William C., et al. did not have good efficiency, and they did not teach a possibility of mass production.

SUMMARY OF THE INVENTION

The present invention is a device that converts oxygen from carbon dioxide by breaking the molecule bonds between the carbon atom and the oxygen atoms. In short, the device products a novelty approach to generate oxygen without chemical reaction.

The device comprises a housing that provides an accommodating space, wherein an axial compressor, a centrifuge compressor, a reactor drum, and an air pump are equipped inside the accommodating space in order. Wherein the reactor drum is a novelty reactor, the surface of the reactor drum contains a plurality of drum craterlets, and the wall of the accommodating space adjacent to the reactor drum also contains a plurality of housing craterlets relevant to the drum craterlets.

The operation of the device starts from the combination of the axial compressor and the centrifuge compressor, which inhales the carbon dioxide rich air, plus an air pump to increases its flow to a high speed, then the flow of carbon dioxide rich air will pass through the surface of the drum. While the flow is passing through the reactor drum, the drum craterlets and housing craterlets will disturb the carbon dioxide stream, which causes the carbon dioxide to bounce between the drum craterlets and housing craterlets. In other words, the carbon dioxide collides with the reactor drum and housing repeatedly. When this collision happens at a flow rate over 5 km/s plus the force of the spinning reactor drum act as a bat hitting the ball further enhance the collision effect, the molecule bonds of carbon dioxide molecules will bend and break to convert the carbon dioxide molecules into carbon atom and oxygen atoms as a result.

Moreover, a wind turbine is being placed behind the air pump, wherein the wind turbine and the reactor drum are connected together by an inner shaft. When the oxygen rich air spurts out from the air pump, the oxygen rich air will pass through the wind turbine and rotates the inner shaft to thrust the reactor drum.

The device, as mentioned earlier, provides a solution to the greenhouse effect, which eliminates the carbon dioxide and generates oxygen by physical method, and advances a design to enhance the conversion process, which has the potential of being enlargement.

DETAILED DESCRIPTION OF THE INVENTION

Figure 1:
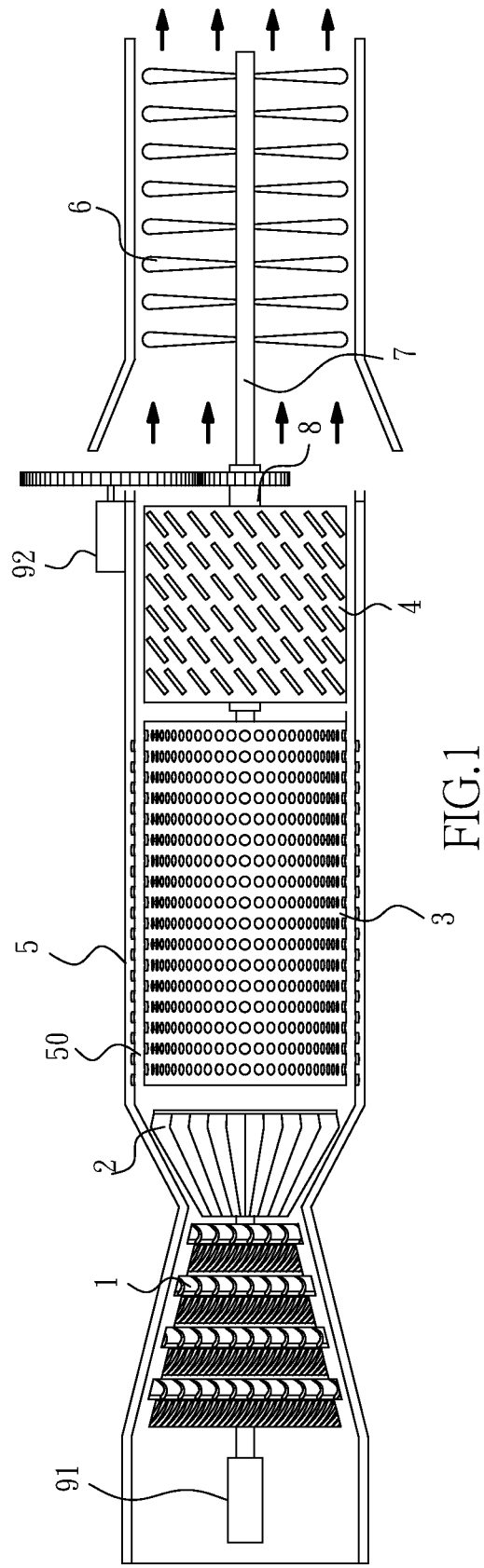
FIG. 1 shows a schematic diagram of the device.

Referring FIG. 1 shows a schematic diagram of the device. The device comprises, in order, an axial compressor 1, a centrifuge compressor 2, a reactor drum 3, and an air pump 4, wherein the device further comprises a housing 5 provided an accommodating space 50 to house the above assemblies together.

Wherein the device further comprises a wind turbine 6 placed behind the air pump 4, and the wind turbine 6 connected with the reactor drum 3 by an inner shaft 7 which cut through the air pump 4 and reach the reactor drum 3. Wherein the pump motor 92 installed besides the air pump 4, and an outer shaft 8 equipped on the axle center of the air pump 4, the pump motor 92 further engaged with the outer shaft 8 by a pair of gears to drive the air pump 4. In other words, the inner shaft 7 is covered by the outer shaft 8.

Figure 2:
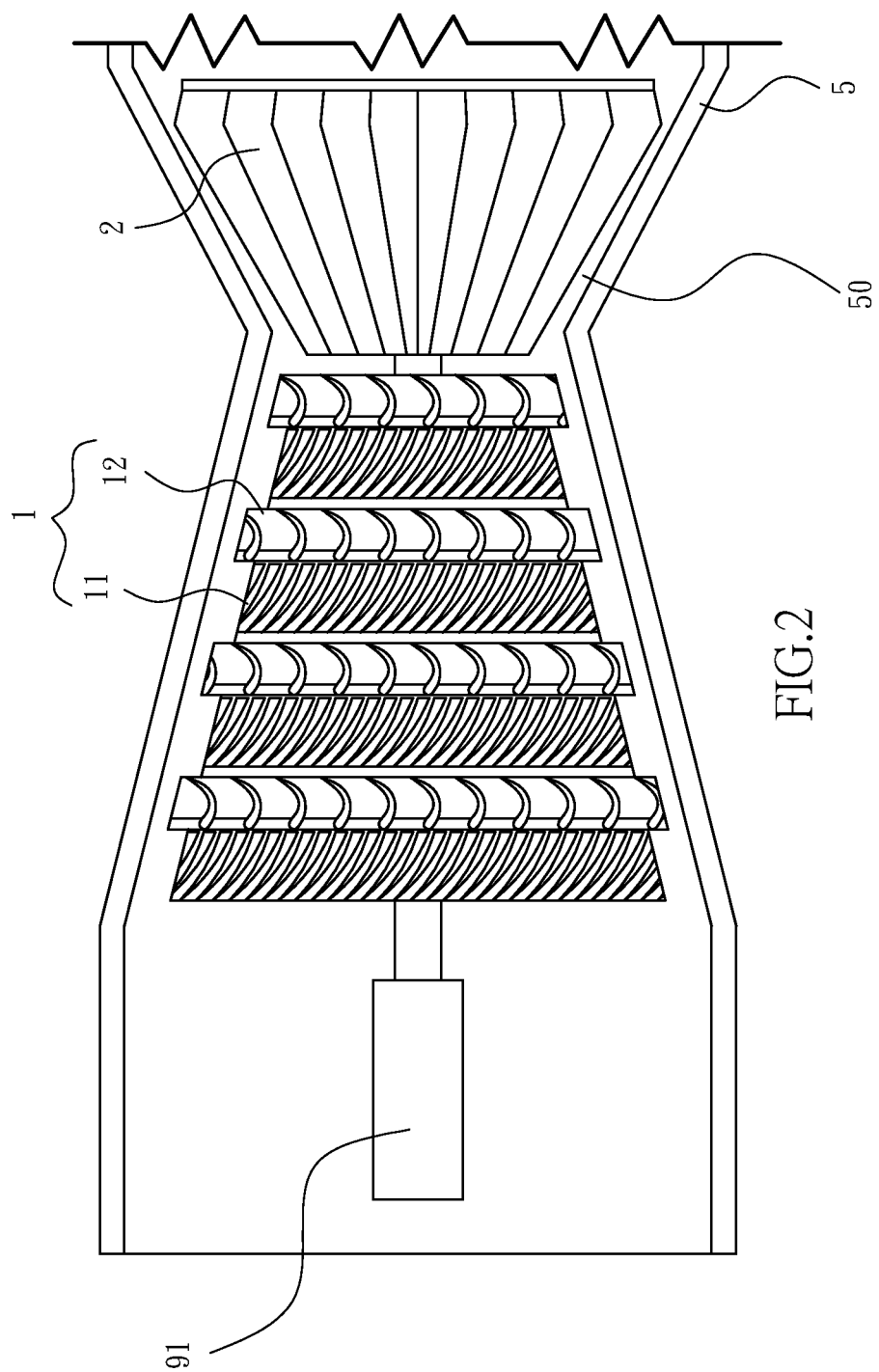
FIG. 2 shows a schematic diagram of axial compressor and centrifuge compressor.

Referring FIG. 2 shows a schematic diagram of axial compressor 1 and centrifuge compressor 2. Axial Compressor 1 and centrifuge compressor 2 is combined to inhale the carbon dioxide rich air into the accommodating space 50, and a compressor motor 91 is provided to connect with the axial compressor 1 and centrifuge compressor 2. The axial compressor 1 is constituted by plenty of interleaved rotor blades 11 and stator 12 to inhale the carbon dioxide, then the centrifuge compressor 2 further tosses the carbon dioxide rich air and then it will flow thru the accommodating space 50; moreover, the air pump 4 also accelerates the flow rate to a high speed to simulate the comet's speed to bend and break the carbon dioxide molecule. The comet's speed which this invention simulated is based on the discovery in Le Roy, Léna, et al. "Inventory of the volatiles on comet 67P/Churyumov-Gerasimenko from Rosetta/ROSINA." Astronomy & Astrophysics 583 (2015): A1.

Figure 3:
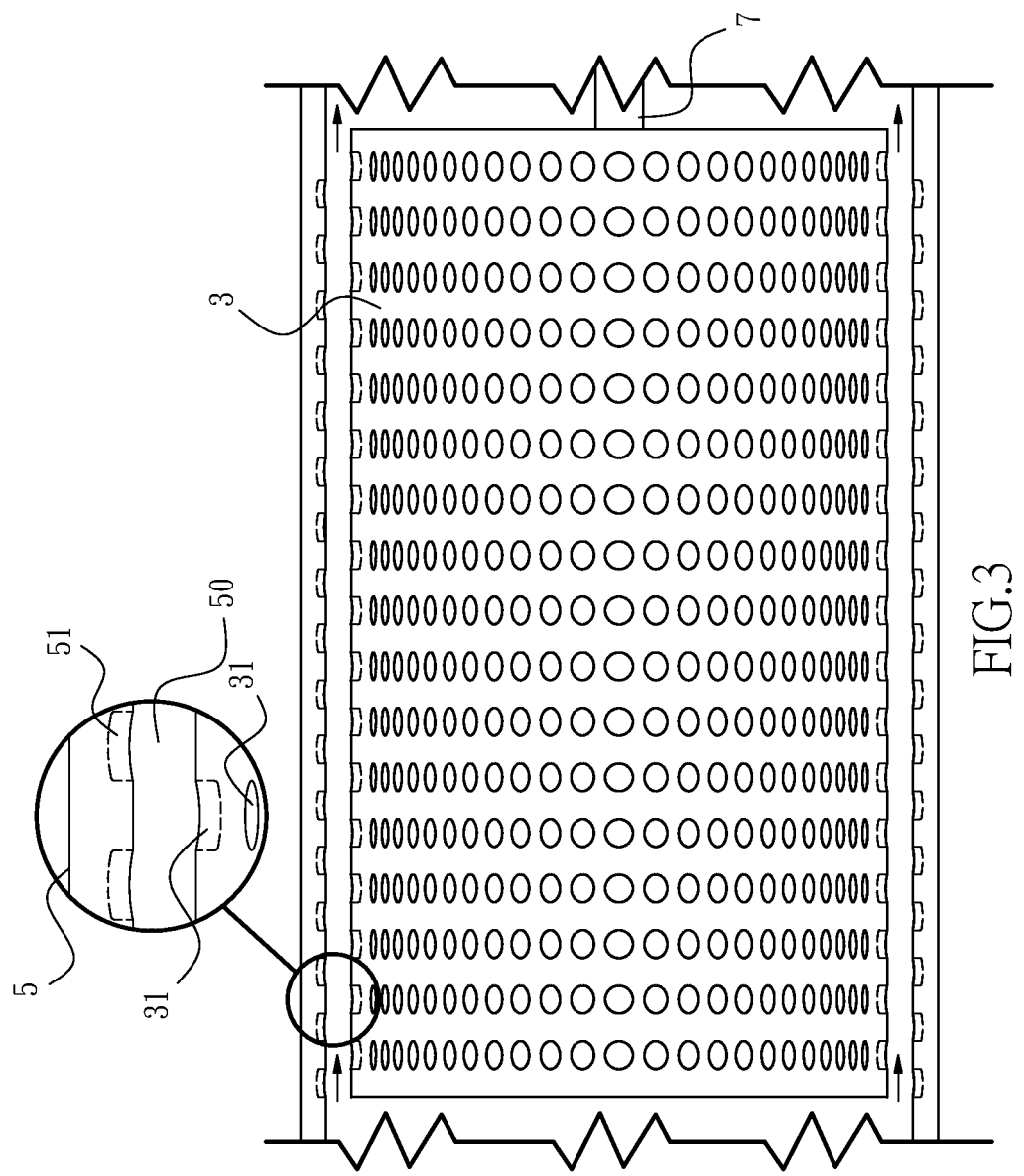
FIG. 3 shows a schematic diagram of reactor drum.

Referring FIG. 3 shows a schematic diagram of reactor drum 3. Reactor drum 3 is a cylinder with a plurality of drum craterlets 31 covering the reactor drum 3. The wall of the accommodating space 50 also has a plurality of housing craterlets 51 relatives to the drum craterlets 31.

Figure 4:
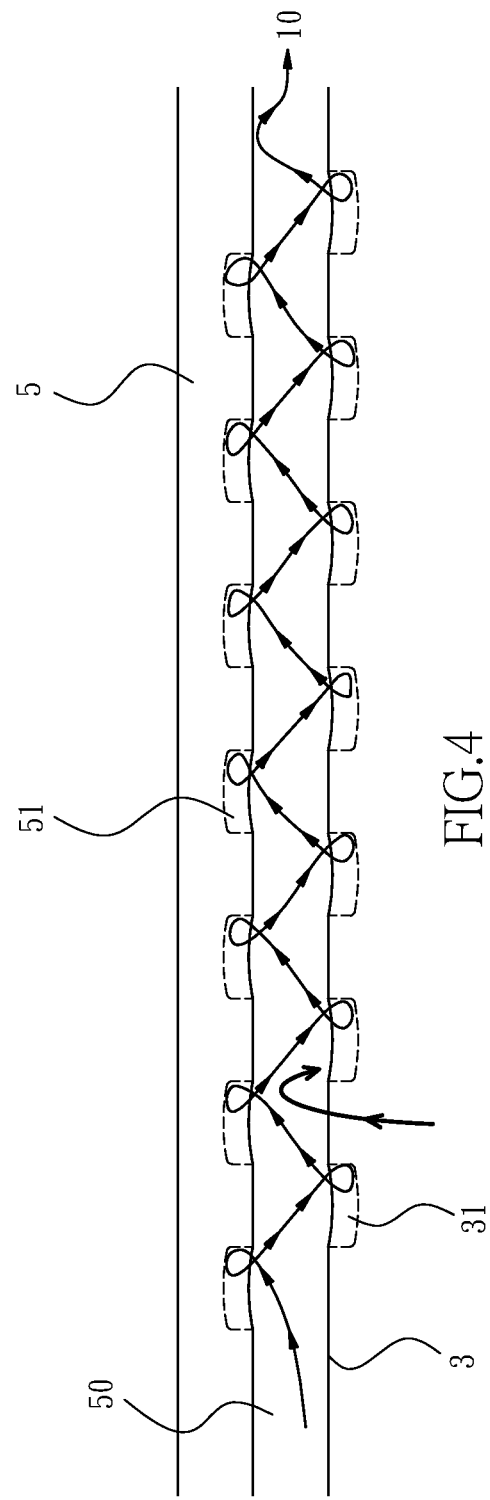
FIG. 4 shows a schematic diagram of the portion of reactor drum and accommodating space.

Referring FIG. 4 shows a schematic diagram of the portion of drum 3 and accommodating space 50. The distance between the reactor drum 3 and the accommodating space 50 is 1 cm, the diameter of the craterlet is 1 cm, and the depth of the craterlet is 5 mm. In addition, the surface of the reactor drum 3 and the wall of the accommodating space 50 is coated with silicon carbide, which this material is a non-oxidation minerals and have the hardness to take the constant beating, and can tolerate the high temperature, and have rough surfaces to bend and break the carbon dioxide molecule apart more efficiently.

When the carbon dioxide flow enters the accommodating space 50 where the reactor drum 3 is placed, and the carbon dioxide molecules 10 keeps bouncing between the drum craterlets 31 and the housing craterlets 51, plus the hitting force of the spinning reactor drum 3 which cause a solid collision to the carbon dioxide molecules 10. When this collision happens at a high speed, the molecule bonds of the carbon dioxide molecules will bend and break and convert the carbon dioxide molecules into carbon atom and oxygen atoms. Wherein the rotation of the reactor drum 3 will also increase the strength and the rate of the collision.

Figure 5:
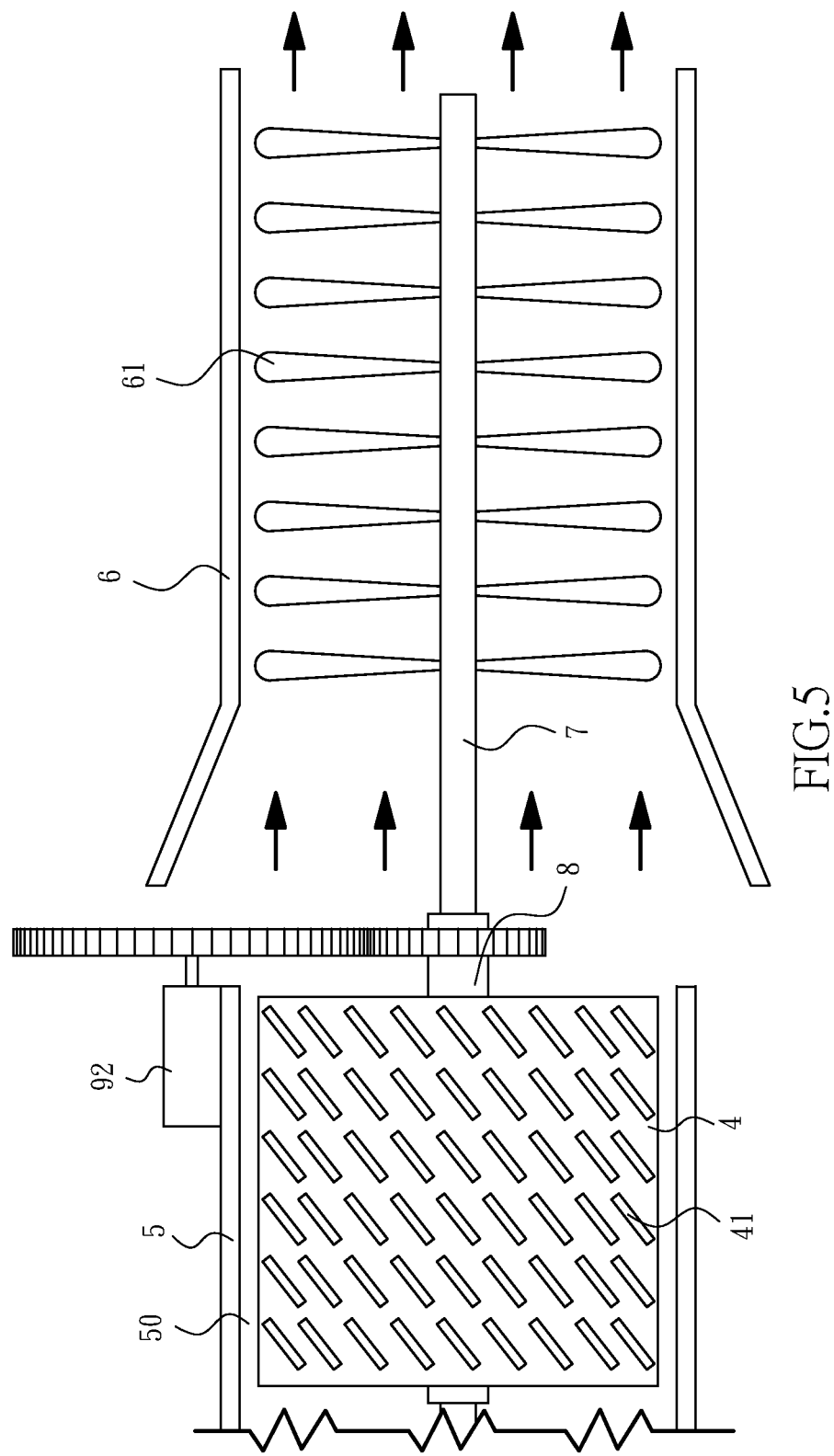
FIG. 5 shows a schematic diagram of air pump and wind turbine.

Referring FIG. 5 shows a schematic diagram of air pump 4 and wind turbine 6. The surface of the air pump 4 is mounted with a plurality of rotor blades 41; when the pump motor 92 thrust the air pump 4 which collaborate with axial compressor 1 and centrifuge compressor 2 to maintain the air speed in the converter, the air pump 4 will drag the oxygen rich air out of the housing 5. Wherein the wind turbine 6 comprises a serial of propeller blades 61; the turbine 6 is designed to reuse the wind energy to generate an extra thrust to rotate the reactor drum 3 faster to increase the strength and rate of the collision. Furthermore, the wind turbine 6 has been designed in a trump shape to increase its ability to collect the exhale wind.

In an embodiment, the head motor and the tail motor are both the Rexroth IndraDyn H motors presented by Bosch, wherein the rotational speed of the head motor and the tail motor is 20000 rpm, their rated power is from 8 to 89 kw. The head motor provides the axial compressor 1 and centrifuge compressor 2, plus the tail motor provides the air pump 4 to generate airflow at a flow rate of over 5 km per second.

Furthermore, while the reactor drum 3 and the air pump 4 rotate in a counterclockwise direction, the axial compressor 1 and centrifuge compressor 2 shall be rotates in a clockwise direction in order to maintain the housing 5 stability.

Wherein the dimensions of the device are 1 m by 7 m, and the size can be enlarged to increase its capacity as long as the cratorlets size and spacing between the cratorlets are remained.

As state above, the device is capable of converting carbon dioxide to oxygen. It could be utilized in the coal & fossil fuel power plant, incineration facilities, steel & cement manufacturing, and other polluting industries as an air treatment facility. The farmer could also use the device to treat the agriculture waste, including concentrated animal farm and composting yard or in the metropolitan heavy traffic area and large building indoor.

The device is also an oxygen generator that supplies air for airtight structures, including subway tunnels, mine tunnels, and underground military facilities.

Besides, the device generates an airflow at a flow rate of over 5 km per second, enabling it to be a part of the Hyperloop high-speed transportation system founded by Musk Elon. The device could help the Hyperloop high-speed transportation system by piping this convertor's exhale air into the tunnel as a thrust to push the capsule forward.

The device, as mentioned earlier, provides a solution to the greenhouse effect, which eliminates the carbon dioxide and generates oxygen by physical method, and advances a design to enhance the conversion process, which has the potential of being enlargement.

What is claimed is:

1. A device for conversion of carbon dioxide to oxygen, the device comprising:
    a housing defining an accommodating space;
    an axial compressor disposed in a head end of the accommodating space;
    an air pump disposed in a tail end of the accommodating space;
    a reactor drum disposed between the axial compressors and the air pump;
    a centrifuge compressor disposed between the axial compressor and the reactor drum;
    a head motor connected with the axial compressor and the centrifuge compressor;
    a tail motor connected with the air pump;
    wherein a plurality of drum craterlets are disposed on an outer surface of the reactor drum;
    wherein a plurality of housing craterlets are disposed on an inner wall of the accommodating space that is adjacent to the reactor drum.

2. The device of claim 1, further comprising a wind turbine disposed adjacent to the air pump and connected with the reactor drum through an inner shaft.

3. The device of claim 2, wherein the wind turbine includes a serial fan blade mounted on the inner shaft.

4. The device of claim 1, wherein a diameter of the drum craterlets and housing craterlets are double their depth.

5. The device of claim 1, wherein a diameter of the drum craterlets and housing craterlets is 1 cm.

6. The device of claim 1, wherein the outer surface of the drum and the inner wall of the housing are coated with silicon carbide.

7. The device of claim 1, wherein the reactor drum is made from light weight metal.

8. The device of claim 1, wherein a distance between the outer surface of the drum and the inner wall of the housing is 1 cm.

9. The device of claim 1 generates an airflow thru the reactor drum at a flow rate of over 5 km per second.

10. The device of claim 1, wherein a rotational speed of the head motor and the tail motor is 20000 rpm, and a rated power is from 8 to 89 kw.

11. The device of claim 1, wherein rotations of the compressor and of the air pump are in opposite direction.

12. The device of claim 2, wherein the wind turbine receives an exhale air to thrust the reactor drum, wherein the exhale air is generated by the axial compressor, the centrifuge compressor, and the air pump.

13. The device of claim 12, wherein the wind turbine receives the exhale air to decrease a flow rate of the exhale air.

* * * * *